May 10, 1938. W. V. DRAPER ET AL 2,116,826
PROCESS OF MAKING COMPOSITE PICTURES
Filed July 2, 1934
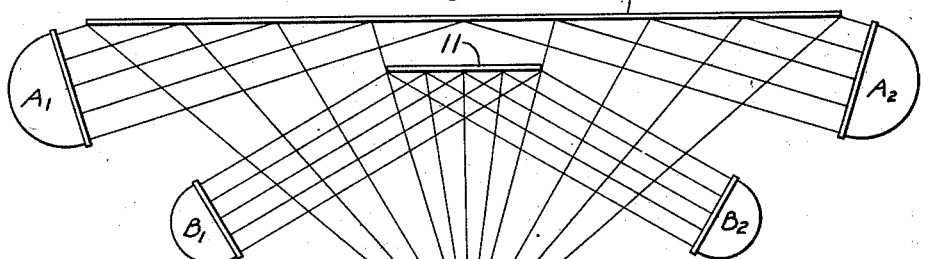
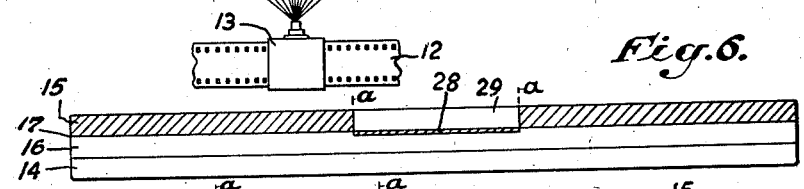
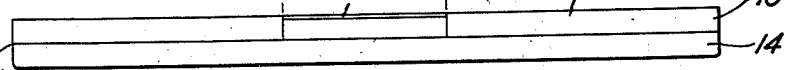
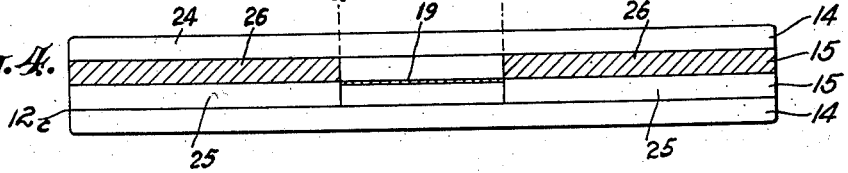
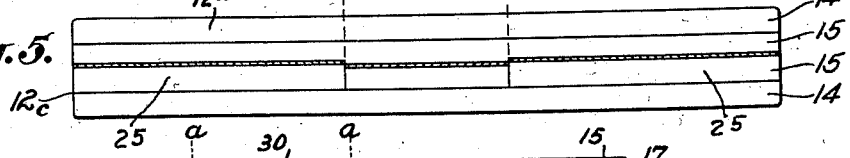
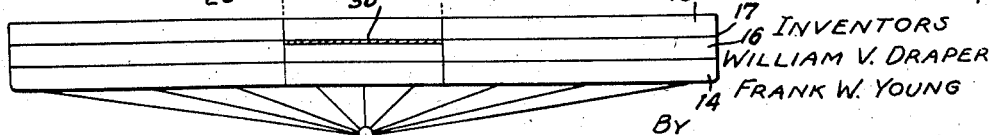
INVENTORS
WILLIAM V. DRAPER
FRANK W. YOUNG
BY
Charles K. Stokes
ATTORNEY.

Patented May 10, 1938

2,116,826

UNITED STATES PATENT OFFICE 2,116,826

PROCESS OF MAKING COMPOSITE PICTURES

William Vernon Draper and Frank William Young, Palms, Calif., assignors of one-third to Charles L. Stokes, Los Angeles, Calif.

Application July 2, 1934, Serial No. 733,470

10 Claims. (Cl. 88—16)

This invention relates to a process of preparing pictures for reproduction through a projector and has for its principal object the preparation of composite pictures in the motion picture industry in which a single film provides a perfect reproduction of an animated scene superimposed on a predetermined background, which background may be photographed at any place and at any time distinct and apart from photographing the animated scene.

In making motion pictures having composite features, it is considered desirable to photograph the actors, or players in a certain play, or scene, and dispense with their services as quickly as possible thereafter, because the living element is the most costly to maintain. Naturally, it is likewise desirable to photograph such actors in as simple fashion as possible and complete the picture as far as they are concerned in a single locality, such as a studio, without the great expense of transporting their persons and materials to a location where a desired natural background for the play exists.

For instance, many plays are based on scenes, or scenery, far distant from the place of production, or residence, of the producing company or the actors, and it is the purpose of this invention to provide a process whereby a play may be filmed in its entirety as far as the actors are concerned in, say, California and a suitable background, or scenery, for such play may then be later filmed in any other location, or any other part of the United States or the world on the same film so that the desired composite picture will result for perfect reproduction of both scenes.

It naturally follows that the reverse of this condition also occurs, i. e., the scenery can be photographed at any time and place and the animated scene can be superimposed thereon at any other time and place.

In motion picture film, or other photographic film or plates, the reproductive portion thereof consists of a light sensitive emulsion of gelatine and a silver salt, mostly silver bromide, superimposed on one side of a transparent celluloid base.

When an image is produced on such light sensitive portion it is produced according to the concentration of rays of light reflected from the object photographed to give variations in shading according to the action of light on the silver salt and produces a latent image, or one which must be developed in a dark room to assure permanency.

Many known developers are in use to reduce the light exposed silver salts in the film to metallic silver which now outlines the image, and such image is then fixed in a fixing bath of sodium thiosulphate to remove all unexposed silver salts from the film to yield a negative.

In composite picture work there are two elements, the background and the foreground, the former comprising the location, or setting, desired for the performers of the foreground.

It is a further object of the invention to make a composite picture on a single film by resensitizing a negative produced in the above and well known manner in which a desired foreground is fixed, removing all light sensitive silver salt above and/or below said fixed image, that is to say all unexposed silver salt, so that it is unaffected by further exposure, and exposing the resensitized portion to the desired background.

This process is, therefore, in contravention to present known practice of producing composite pictures in which the foreground is built and then protected by a much heavier duplicate image while the background is being photographed or printed in, because all present known processes are based on the assumption that, because of the transparent nature of the celluloid film, superimposing or double printing of scenes could only be accomplished, without phantoms, by the use of some means for protecting the first made exposure with a relatively opaque copy of the image while the second exposure is being made.

Such processes use what is commonly known as matting which has many defects and results in many failures because a slight error in lighting effects gives poor results and, further, the coverage for the first exposure is never exact, which results in blurring, due to matt lines and inaccuracy in coverages.

On the other hand, in the present process, it may be readily seen that if all silver salts adjacent to and surrounding the first made image on a film are removed and the entire film is then resensitized, it will only be necessary to re-expose, or make light insensitive, that portion of the film comprising the foreground image in order to have a light sensitive remainder which is then exposed in the ordinary manner to perfect the background.

The present process eliminates the use of all present intricate and cumbersome lighting effects by providing for the use of a uniform backing in taking the foreground exposure which, by simple illumination effects, yields an even depth of silver grains surrounding the foreground image and said grains by further processing are resensitized to receive the further background exposure.

From the use of such uniform background adapted to evenly expose all of the film outside of the foreground image to a much greater lighting effect and consequently greater depth than the foreground image, it is clear that not only is there no reproduction on the film of the desired foreground image, but it is impossible practically to overexpose the film because nothing more than the foreground image can be produced in the first exposure and consequently at this time it is unnecessary to protect this image. The problem is rather one of giving the foreground image a maximum of exposure which is accomplished by various methods to be described. The present process utilizes many of the well known backings and/or a variation of a number of combinations of films and/or a plurality of light sensitive emulsions on a single film.

The process is applicable in several ways with single strips of film in common use, but in every case the steps include the exposure of the whole film to modes of lighting which assure only a desired foreground image, the removal of unexposed silver salt from around the foreground image, resensitizing the film, and then re-exposing the film for the desired background.

Referring to the drawing:

Fig. 1 is a plan view in diagram showing the general set-up of a backing, lights, camera and film.

Figs. 2 to 7 inclusive represent diagrammatic cross-sections of film used to illustrate the process.

Referring particularly to Fig. 1, a backing 10 is used to provide a blank on the film to be later exposed to a desired background for the foreground 11 representing the animated scene which is first reproduced on film 12 in camera 13.

Background 10 is adapted to be illuminated by a plurality of lamps A1 and A2 of a desired color and intensity while the foreground 11 is likewise lit by lamps B1 and B2.

The film used in Fig. 1 is illustrated in Figs. 2 to 7 inclusive as being composed in a well known manner of a transparent celluloid base 14 coated with a light sensitive emulsion 15 containing various well known light sensitive silver salts, such as silver bromide, iodide and the like.

In the examples of the process to be disclosed hereafter and for the purpose of clarity, emulsion 15 after exposure is shown in shaded sections while the unexposed sections and the celluloid base are shown clear, it being well understood that the depth to which the silver salts in the emulsion respond to light varies with the color of the light, intensity, etc.

*Example 1*

Referring to Figs. 1 to 5 inclusive, let it be assumed that the film used is a single strip of well known panchromatic film containing silver bromide. The foreground 11 will be lit by lamps B1, B2 in a low key while the background 10 is white and lit in a higher key by the lamps A1, A2 to assure a greater exposure in that part of the film surrounding the image of the foreground 11.

This provides a differential lighting effect to the end that, while only sufficient light is used on foreground 11 to assure good photography, the heavier exposure for the background provides a heavier depth of exposed silver salt surrounding the foreground image for positive and clear cut separation of the two final images and provides that if it is desired to view the foreground action by developing and printing before taking the background scene, such view will be distinct and clear cut without the expense of providing a completed background.

In either event, whether a preview is desired or not, the film 12, exposed as described and illustrated in Fig. 2, is developed, fixed and dried in a well known manner to yield a negative in which the foreground image 11 is reproduced between the lines a—a, while the remainder of the emulsion is exposed to a greater depth but retains no image as the background 10 is blank. The negative of Figure 2 therefore includes the image 19 of the foreground 11 and behind this image 19 is an unexposed area 20 of the same size, both being surrounded by the exposed area 21 of the emulsion.

A positive print is then taken from the thus prepared negative, the greater exposure of the background assuring a positive print which is extremely dense in that portion thereof which represents the foreground 11 and which is blank in that portion representing the background 10.

A positive and a negative having thus been obtained, the silver of the negative is re-converted to a silver bromide by treatment in a bath of combined bromide and ferricyanide of potassium and is then made light sensitive by further treatment in a solution of chromic and nitric acids, cleared in sodium sulphite and dried in the dark.

This gives a film in which the emulsion is reconverted to its original light sensitive condition but which holds a latent image of the foreground 11 together with the blank background 10.

A duplicate negative is prepared in either of three ways for use in the process:

(a) A piece of positive stock is given a sufficiently heavy exposure through the original negative in Fig. 2 (prior to resensitizing the same) to thoroughly expose all parts of the positive stock corresponding to the foreground image with the accompanying clear separation of the foreground image and the blank background, such exposure being arranged to leave all of the portion representing the blank background unexposed while the relatively heavy exposure of the foreground image protects the remaining underlying silver salts from light. If the thus exposed positive stock is then developed, but not fixed, washed and dried, and exposed to light through the emulsion side of the film, the developed image of the foreground may be dissolved away, or removed, in a bath of a mixture of potassium permanganate and oxalic acid, or a mixture of potassium bichromate, sulphuric acid and water, or any combination of any suitable oxidizing agent with any suitable acid or salt to form a soluble silver salt. The remaining exposed silver salts on re-development leave a clear, transparent, portion corresponding to the foreground, while the background is represented as opaque. The piece is then fixed and dried by any standard well known methods and is then ready for use in conjunction with the original negative.

(b) The second method of producing a duplicate negative for use is to take the aforesaid positive print, develop, fix and dry the same by well known methods, and take a negative therefrom which will have exactly opposed characteristics to said print, because the portion representing the background on the print being clear will only permit exposure of the underlying negative in corresponding position, and thus said negative upon the usual developing, fixing, etc. will yield a negative having the same characteristics as the developed positive stock of (a).

An alternative method of making a duplicate negative for the purpose described includes:

(c) A heavy print is first made from the original negative, developed and washed but not fixed. The metallic silver portions of this print are now converted to an orange colored image by toning in a bath of oxalic acid, potassium ferricyanide, and potassium bichromate, washing and drying the print and exposing the same to a blue or violet light, removing the orange colored image in a bath of sodium sulfite and then developing, fixing, washing and drying the print.

The resulting film is a heavy opaque portion representing the background and a clear transparent portion covering the area of the foreground image due to the fact that the blue or violet light cannot penetrate the orange colored image to expose the silver salts surrounding said image.

In (a), (b), and (c) the results are the same for the purposes of this invention, i. e., to produce a strip of film in which the blank background appears opaque while the area of the foreground image appears transparent to be applied and used with the original negative when resensitized.

Such resensitization of the original negative, as described, permits the application of either of the duplicate negatives of (a), (b), or (c) thereto for a thorough exposure therethrough of sufficient light to bring out the latent foreground image of the original negative while the resensitized background is protected from exposure by the opaque background of the duplicate negative so that the thus exposed original negative is ready for use at any time to be exposed to the desired background either on location or by means of a suitable print thereof, whereby the composite picture is obtained.

The above described steps may be better comprehended by the illustrative drawing in which the shaded portions 19 and 21 of Fig. 2 represent the developed portions of the original negative 12a which when resensitized as indicated by the numeral 22 of Fig. 3 reverts to its original emulsion, but now includes a latent image of the foreground between the lines a—a.

Such resensitized original negative 12b of Fig. 3 is then applied to either the duplicate negative 24 of (a), (b), or (c), as shown in Fig. 4, whereby only the latent image of the original underlying negative is re-exposed to suitable light through the selected duplicate to reform the image 19 (the remaining portion 25 representing the desired portion reserved for further background exposure being shielded from the light by the shaded opaque portion 26 of said duplicate) and said thus exposed original negative 12c is then ready to receive, or be exposed to, the desired background.

It is clear, if a background scene is desired to be added to the thus developed original negative, that a print thereof 12d may be superimposed on the original negative 12c, as shown in Fig. 5, and by exposure to suitable light the scenes of said print will be reproduced in the resensitized background portion 25 of the original negative, which is then properly finished to reproduce a composite picture. Alternatively, the resensitized original negative with a fixed foreground image may be exposed through a camera to procure such composite picture.

In the preceding steps outlined, it will be noted that the development of a composite picture includes the resensitization of the original negative as well as the removal of all silver salts below the desired foreground image.

*Example 2*

Referring to Figs. 1, 6 and 7, the backing 10 is blue and illuminated by the lamps $A_1$, $A_2$, which may be screened with blue gelatine filters. The foreground 11 is illuminated with red from the lights $B_1$ and $B_2$. The film 12 in this case is composed of the transparent celluloid base 14 which carries a double-coated emulsion comprising a panchromatic emulsion 16 and a positive emulsion 15 which is sensitive only to blue or violet light or an orthochromatic emulsion, the two emulsions being separated by a layer of red dye 17.

Upon exposure of this film, the upper positive emulsion being sensitive practically only to blue light exposes the silver salts to the blue backing to an even depth while the red dye filter 17, being complementary to blue, prevents the blue light from the backing from exposing the underlying panchromatic emulsion 16.

At the same time the red light from the foreground 11 passes through the red filter 17 to expose and reproduce the foreground image in the panchromatic emulsion 16 as at 28 while the positive emulsion 29 overlying the foreground image of the panchromatic emulsion is unexposed in that portion, being practically insensible to red light.

The thus exposed film is then developed and fixed in a solution of sodium thiosulphate which has the property of dissolving the unexposed silver salts without attacking the metallic silver of the developed image, and thus all the unexposed silver salts of the panchromatic emulsion 16 surrounding and below the foreground image together with the unexposed portion of the positive emulsion 15 above said image are washed out to leave only the developed foreground image 30 in the panchromatic emulsion section and the developed background in the positive emulsion section.

The film is then treated, as before described, in a bath of a mixture of bromide and ferricyanide of potassium which changes the metallic silver in both emulsions back to the original silver salt which is made light sensitive by soaking in a solution containing chromic and nitric acids, clearing in sulphite and dried in the dark.

It is now necessary to re-expose the foreground image without exposing the background, and this is accomplished as illustrated in Fig. 7 by passing a blue light from lamp 18 from the rearward side of the transparent celluloid which will re-expose the foreground image while the red filter 17 will prevent re-exposure of the resensitized background portion of the positive emulsion.

The film is then ready for use either in a printer, or camera, to receive the desired background exposure in the unexposed portion of the positive emulsion which, upon developing and fixing, gives the desired composite picture inasmuch as the red dye filter disappears after washing in a bath of sodium hydrosulphite or other suitable chemicals.

Many applications of the steps of the herein described process can be made. For instance, in the making of motion pictures it is often desirable to have one scene dissolve into another scene gradually, which relieves the shock of too suddenly transporting an audience to entirely different surroundings. In making such pictures, it is practically impossible to use the present high speed cameras (because they are inaccessibly enclosed in a sound-proof container, or "blimp") for making such dissolving scenes which are known in the art as "laps" and "wipes". Consequently, it has been assumed that it is necessary to make a second negative of the scenes to be "wiped" or "lapped" to accomplish the purpose which results in a loss of quality.

Utilizing the present process it can be seen that when the image has been reconverted to a silver salt, or bromide, as described, and resensitized, it is only necessary when the re-exposures are being made to gradually close the camera shutter at some given point or to obstruct the light in a predetermined sequence to accomplish the desired result because the silver bromide is soluble in hypo-sulphite. Thus, when the film is developed only those portions which have been exposed to light are converted to metallic silver. In consequence, those parts which were protected from light, or those parts on which the exposure was lessened by closing the shutter, will not develop, or the amount of silver exposed by gradually closing the shutter will be gradually lessened, resulting in only developing a portion of the silver, but in both cases the result is a series of frames composed in part of metallic silver and part silver bromide.

When this film is fixed in the hypo bath, the silver bromide will dissolve out to leave only the exposed portions; consequently, if it is desirable to overlap this scene with another having an opposite effect, it is only necessary to cut the overlapping part from one of the scenes and remove the celluloid base by dissolving the same in a solvent such as acetone, or lacquer thinner, which leaves the picture suspended in a thin layer of gelatine, which may then be attached to the other scene by means of photographic gelatine glue and the two scenes can then be patched together.

Likewise, the present system affords a method of exercising control over the contrast, or lack of contrast, in a scene, or in other words, offers a way of salvaging scenes which have been badly exposed.

If, in the original exposure of a scene, the subject is over-lighted, the shadows which should be represented in the negative as clear film receive an exposure while the high lights are being exposed to a greater depth than is necessary for good photography, the result being an overall fogged effect which usually will not extend into the emulsion to any great depth.

It follows, then, that if a layer of the top side could be evenly removed, the desired contrast between high-lights and shadows would be restored, which is accomplished by the control of the present system.

The picture in its proper proportions may be visualized as a series of peaks and valleys resting in the lower part of the emulsion but covered on top with an overall blanket robbing it of its contrast. If such a negative is reconverted to a silver bromide and resensitized it can be re-exposed to any desired degree. That is to say the exposure thereof to an even source of light will bring back the image in degree varying with the amount of light used.

If now the light is admitted through the celluloid side of the film and the exposure controlled so that only the peaks in the lower stratum of the emulsion are exposed, the overall blanket of fog on the top side of the emulsion will remain as silver bromide upon development to be dissolved out in the hypo bath.

The reverse is true in a negative having too much contrast. In this case the high lights are too heavy to blend harmoniously with the clear shadows. If the resensitized negative is only partly exposed through the top side of the emulsion, the lower peaks of the high lights will be unexposed and lost in the hypo bath, thus making for a more perfect blend with the clear shadows.

It is obvious that the herein disclosed process may be used in connection with any kind of photographic film pictures and is not limited to motion pictures, as it can be applied to great advantage in making so-called "stills."

It may be understood that, in some cases, it is unnecessary to develop chemically the exposed film, but the final result will be the same. For instance, if the exposed film is washed in a weak hypo solution to which ammonia has been added, the unexposed silver salt will be dissolved before the latent image is attacked, which is gaged by the strength of the solution and time of immersion.

However, in this case, it is still necessary to re-sensitize the film, as in the other examples illustrated.

We claim as our invention:

1. A process of making a composite picture which comprises: exposing a photographic element having a light sensitive silver halide emulsion to such conditions of light applied from one side thereof as to impose a reproducible image of a scene on one area of the element and controlling the exposure in adjacent areas of said element to provide reduced silver but no reproducible image therein, developing the emulsion, removing the unexposed silver salts, treating the silver in the emulsion to make the same light sensitive, re-exposing the area of said reproducible image to light applied from the same side of said element as before while protecting the remainder of the emulsion from light, exposing the unexposed remainder of said emulsion to a second different image, then developing and fixing the emulsion.

2. A process of making a composite picture which comprises: exposing a photographic element having a light sensitive silver halide emulsion to such conditions of light applied from one side thereof as to impose a reproducible image of a scene on one area of the element and controlling the exposure in adjacent areas of said element to provide reduced silver but no reproducible image therein, developing the emulsion, removing the unexposed silver salts, treating the silver in the emulsion to make the same light sensitive, re-exposing the area of said reproducible image to light applied from the side of said element opposite to that before stated while protecting the remainder of the emulsion from light, exposing the unexposed remainder of said emulsion to a second different image, then developing and fixing the emulsion.

3. A process of making a composite picture which comprises: exposing a photographic element having a light sensitive silver halide emulsion to such conditions of light as to impose a reproducible image of a scene on one area of the element and controlling the exposure in adjacent areas of said element to provide reduced silver but no reproducible image therein, developing the emulsion, fixing the emulsion, treating the silver in the emulsion to make the same light sensitive, re-exposing the area of said reproducible image to light while protecting the remainder of the emulsion from light, exposing the unexposed remainder of said emulsion to a second different image, then developing and fixing the emulsion.

4. A process of making a composite picture which comprises: exposing a photographic element having a light sensitive silver halide emulsion to such conditions of light as to produce an image on one area of the element and to simultaneously produce strong uniform exposure of the silver halide on an adjacent area of the element, developing the emulsion, fixing the emulsion to remove unexposed silver salts from the image area of the emulsion, converting the silver in the emulsion into a light sensitive silver salt, re-exposing the image area to light while protecting the remainder of the resensitized emulsion from light, exposing the unexposed remainder of said emulsion to a second different image, and then developing and fixing the emulsion.

5. A process of making a composite picture which comprises: exposing a photographic element having a light sensitive silver halide emulsion to such conditions of light as to produce an image on one area of the element and to simultaneously produce strong uniform exposure of the silver halide on an adjacent area of the element, developing the emulsion, fixing the emulsion to remove unexposed silver salts from the image area of the emulsion, converting the silver in the emulsion into a silver salt by a bath of combined potassium bromide and potassium ferricyanide, resensitizing such silver salt, re-exposing the image area to light while protecting the remainder of the resensitized emulsion from light, exposing the unexposed remainder of said emulsion to a second different image, and then developing and fixing the emulsion.

6. A process of making a composite picture which comprises: exposing a photographic element having a light sensitive silver halide emulsion to such conditions of light as to produce an image on one area of the element and to simultaneously produce strong uniform exposure of the silver halide on an adjacent area of the element, developing the emulsion, fixing the emulsion to remove unexposed silver salts from the image area of the emulsion, converting the silver in the emulsion into a light sensitive silver salt, re-exposing the image area to light through a mask film having an opaque area surrounding a clear silhouette of said image on said element, exposing the unexposed remainder of said emulsion to a second different image, and then developing and fixing the emulsion.

7. In a process of making a picture in which a photographic element having a light sensitive silver halide emulsion is exposed to such conditions of light as to produce an image on one area of the element and the exposure of adjacent areas of said element is so controlled as to provide reduced silver but no reproducible image therein, the thus exposed element is developed and then fixed to remove unexposed silver salts, the combination of steps which comprise: converting the silver in the emulsion into a light sensitive silver salt, re-exposing only said first image area to light, and thereafter exposing said adjacent area to a second different image.

8. In a process of making a picture in which a photographic element having a light sensitive silver halide emulsion is exposed to such conditions of light as to produce an image on one area of the element and the exposure of adjacent areas of said element is so controlled as to provide reduced silver but no reproducible image therein, the thus exposed element is developed and then fixed to remove unexposed silver salts, the combination of steps which comprise: converting the silver in the emulsion into a light sensitive silver salt, re-exposing only said first image area to light, and thereafter exposing said adjacent area to a second different image, then developing and fixing said element.

9. In a process of making a picture in which a photographic element having a light sensitive silver halide emulsion is exposed to such conditions of light as to produce an image on one area of the element and to simultaneously expose an adjacent area of the element and the thus exposed element is developed and then fixed to remove unexposed silver salts, the combination of steps which comprise: converting the silver in the emulsion into a light sensitive silver salt, re-exposing only said first image to light, and thereafter exposing said adjacent area to a second different image.

10. In a process of making a picture in which a photographic element having a light sensitive silver halide emulsion is exposed to such conditions of light as to produce an image on one area of the element and to simultaneously expose an adjacent area of the element and the thus exposed element is developed and then fixed to remove unexposed silver salts, the combination of steps which comprise: converting the silver in the emulsion into a light sensitive silver salt, re-exposing only said first image to light, and thereafter exposing said adjacent area to a second different image; the exposures to light in all of the steps of the process being made from the same side of the element.

WILLIAM VERNON DRAPER.
FRANK WILLIAM YOUNG.